United States Patent
Iyer et al.

(10) Patent No.: US 8,520,849 B2
(45) Date of Patent: Aug. 27, 2013

(54) ENCRYPTION BY PIXEL PROPERTY SEPARATION

(75) Inventors: Karthik Chandrashekar Iyer, Bangalore (IN); Aravinda Subramanya, Bangalore (IN)

(73) Assignee: Entropic Communications, Inc., San Diego, CA (US)

( * ) Notice: Subject to any disclaimer, the term of this patent is extended or adjusted under 35 U.S.C. 154(b) by 448 days.

(21) Appl. No.: 12/678,283

(22) PCT Filed: Sep. 9, 2008

(86) PCT No.: PCT/IB2008/053630
§ 371 (c)(1),
(2), (4) Date: Jun. 4, 2010

(87) PCT Pub. No.: WO2009/034520
PCT Pub. Date: Mar. 19, 2009

(65) Prior Publication Data
US 2010/0241869 A1 Sep. 23, 2010

(30) Foreign Application Priority Data

Sep. 13, 2007 (GB) .................................. 0718699.2
Apr. 23, 2008 (EP) .................................. 08103697

(51) Int. Cl.
*H04N 7/167* (2011.01)
(52) U.S. Cl.
USPC ...................................................... 380/201
(58) Field of Classification Search
USPC ... 73/189, 193; 713/189, 193; 380/200–201, 380/203
See application file for complete search history.

(56) References Cited

U.S. PATENT DOCUMENTS

| 6,064,738 | A * | 5/2000 | Fridrich ......................... 380/28 |
| 7,826,618 | B2 * | 11/2010 | Klingler et al. ............... 380/274 |
| 2004/0015697 | A1 | 1/2004 | de Queiroz | |

OTHER PUBLICATIONS

Yuanzhi Wang et al., "Image Encryption Method Based on Chaotic Map" Industrial Electronics and Applications, 2007. ICIEA 2007. 2nd IEEE Conference on May 1, 2007, IEEE, PI, pp. 2558-2560, XP031137810; ISBN: 978-1-4244-0736-1.
S. E. El-Khamy et al., "A new color image encryption. technique utilizing fuzzy pseudo-random bit generator", Radio Science Conference, 2005. NRSC 2005. Proceedings of the Twenty-Second National Cairo, Egypt Mar. 15-17, 2005, Piscataway, NJ, USA, IEEEE, Mar. 15, 2005, pp. 185-194, XP010833616; ISBN: 978-977-5031-83-9.
Jui-Cheng Yen et al., "A new chaotic key-based design for image encryption and decryption", Circuits and Systems, 2000. Proceedings. ISCAS 2000 Geneva. The 2000 IEEE International Symposium on May 28-31, 2000. Piscataway, NJ,USA, IEEEE, vol. 4, May 28, 20000, pp. 40-52, XP010503534. ISBN: 978-0-7803-5482-1.

* cited by examiner

*Primary Examiner* — Eleni Shiferaw
*Assistant Examiner* — Jing Sims
(74) *Attorney, Agent, or Firm* — Bruce Greenhaus; Richard Bachand; Duane Morris LLP

(57) ABSTRACT

A method of encrypting a digital file composed of a sequence of bytes, each byte defined by a relative position within the digital file and a value, the method comprising: using an encryption key to encode the relative position separately from the value of each byte; and producing an encrypted digital file in which the correlation between relative position and value of each byte in the original digital file is concealed in the encrypted digital file.

12 Claims, 6 Drawing Sheets

Figure 1:
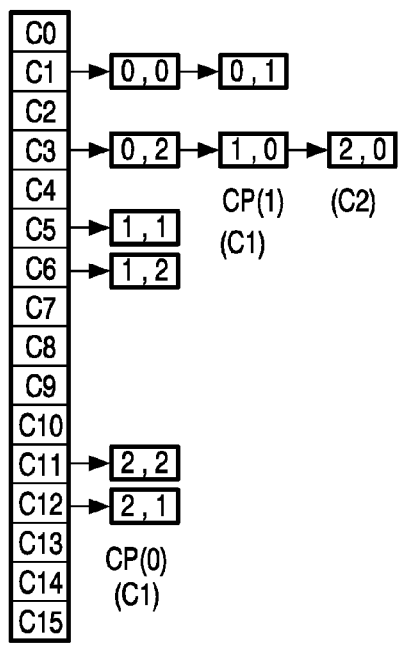

The encryption System, 1.1 Image img, 1.2 Colour based pixel grouping, 1.3 Permutations The encryption System, 1.1 Image img, 1.2 Colour based pixel grouping, 1.3 Permutations

| B1 | B2 | B3 | B4 | B5 | B6 |
|---|---|---|---|---|---|
| 00000001 | 0 0101101 | 11 0 10011 | 0001 0111 | 01011 0 00 | 11010011 |
| w1=2 | h1=183 | w2=305 | h2=235 | | |

Cryptanalytic Error Avalanche Effect - Original

| B1 | | B3 | B4 | B5 | B6 |
|---|---|---|---|---|---|
| 00000001 | | 1 1010011 | 00 0 10111 | 0101 1000 | 11010 0 11 |
| w1=3 | | h1=332 | w2=373 | h2=282 | |

Cryptanalytic Error Avalanche Effect - Erroreous percentage Inequality for Lena Image Variation of W' and H' against key1

Encryption Result : Lena (a) Original Image (b) Encrypted Image

Encryption Result : Red Flowers (a) Original Image (b) Encrypted Image

Histogram : Red (a) Original (b) Encrypted

Histogram : Green (a) Original (b) Encrypted

Histogram : Blue (a) Original (b) Encrypted

Encryption Result : Single Colour (a) Original Image (b) Encrypted Image

ENCRYPTION BY PIXEL PROPERTY SEPARATION

FIELD OF THE INVENTION

The present invention relates to methods and apparatus for encryption and decryption of digital data, for example in the form of digital image files.

BACKGROUND

Image and data security is a major challenge in Storage and Transmission applications. Encryption algorithms for these applications are exposed to various threats and security breaches due to the availability of immensely powerful and inexpensive computational resources. Brute Force and Statistical attacks on the existing cryptographic algorithms is not only possible, but are becoming more practical in the wake of technological advancements like Distributed and Grid Computing. Vast amounts of data can be processed in parallel by agents distributed over the Internet and aid in revealing secure information. Several data encryption algorithms like DES [1], AES[1], IDEA[1] are being employed for protecting digital information, chaos based [5][17], combinatorial permutation [13] and optical techniques [12] are also proposed for encrypting images. Along with these developments in the security domain, the vulnerability of the algorithms are also being exposed. It is possible to build a machine that can determine the key used for DES encryption at a cost as low as US $10000 [16]. It is also vulnerable to Linear and Differential cryptanalysis or a combination of both. Techniques like the Side Channel Attack and several Cache Timing Attacks have been developed to compromise AES algorithm and retrieve the encryption key in as less as 65 ms with 800 write operations [6]. Chaos based techniques like the CKBA are prone to plaintext attacks [7] and algorithms using combinatorial permutations are as strong as the permutation of the least sized block even if they apply multiple permutations over different sized image blocks.

Applications in the Automobile, Medical, Construction and the Fashion industry require designs, scanned data, building plans and blue-prints to be safe-guarded against espionage. Considering the long lifetime of images in the mentioned domains, it is imperative to develop and employ techniques which protect the content throughout their lifetime.

It is an object of the present invention to address one or more of the above problems. In particular, an object of the invention is to provide techniques for protecting the content of digital images.

SUMMARY OF THE INVENTION

In accordance with a first aspect of the invention there is provided a method of encrypting a digital file composed of a sequence of bytes, each byte defined by a relative position within the digital file and a value, the method comprising:
   using an encryption key to encode the relative position separately from the value of each byte; and
   producing an encrypted digital file in which the correlation between relative position and value of each byte in the original digital file is concealed in the encrypted digital file.

In accordance with a second aspect of the invention there is provided an apparatus for encrypting a digital file composed of a sequence of bytes, each byte defined by a relative position within the digital file and a value, the apparatus comprising:
   means for using an encryption key to encode the relative position separately from the value of each byte; and
   means for producing an encrypted digital file in which the correlation between relative position and value of each byte in the original digital file is concealed in the encrypted digital file.

In accordance with a third aspect of the invention there is provided a method of decrypting an encrypted digital file in which a correlation between position and value of each byte in the digital file is concealed in the encrypted digital file, the method comprising:
   using a decryption key to decode the relative position and value of each byte in the digital file from the encrypted digital file; and
   producing a decrypted digital file from the decoded position and value of each byte.

In accordance with a fourth aspect of the invention there is provided an apparatus for decrypting an encrypted digital file in which a correlation between position and value of each byte in the digital file is concealed in the encrypted digital file, the apparatus comprising:
   means for using a decryption key to decode the relative position and value of each byte in the digital file from the encrypted digital file; and
   means for producing a decrypted digital file from the decoded position and value of each byte.

In accordance with a fifth aspect of the invention there is provided a computer program for instructing a computer to perform the method of the first or third aspects of the invention.

It is to be understood that references to images throughout the description are intended to also encompass references to digital files representing a visible image, and not only to the actual representation of such an image.

DETAILED DESCRIPTION

Figures 2, 3, 4:
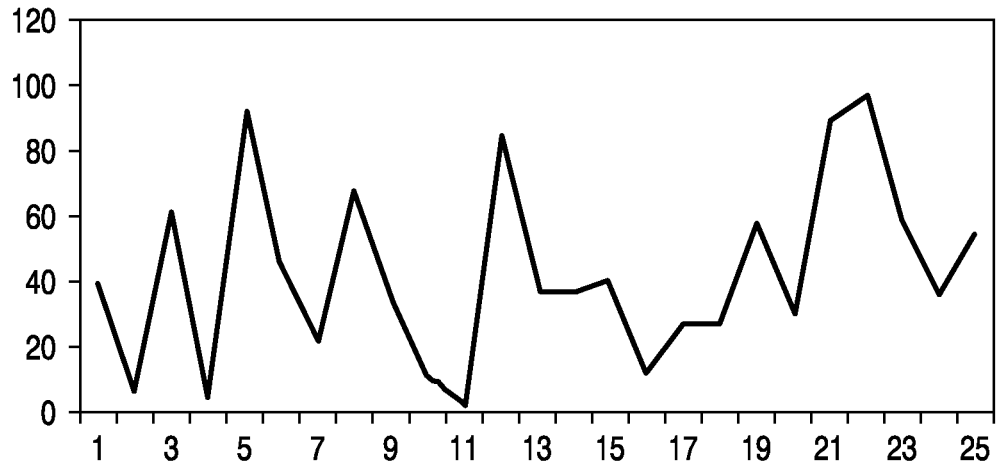
Figure 5:
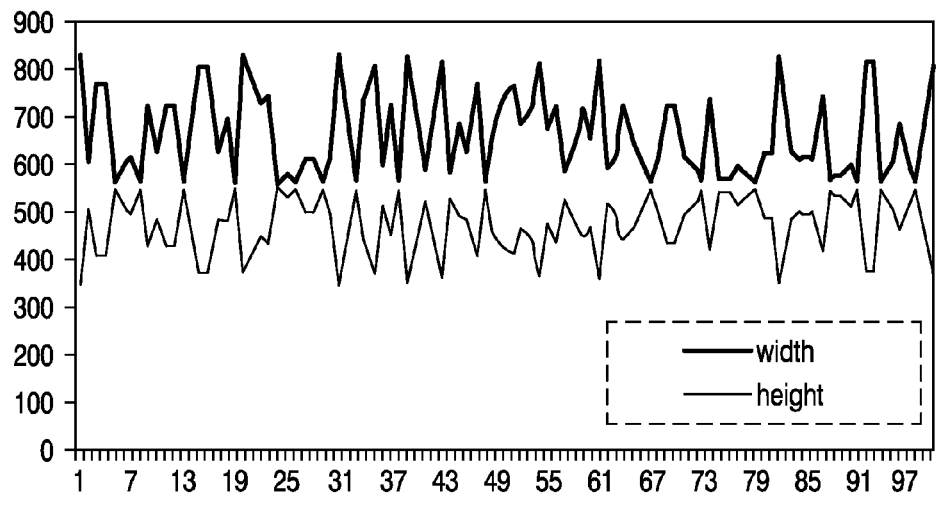
Figure 6:
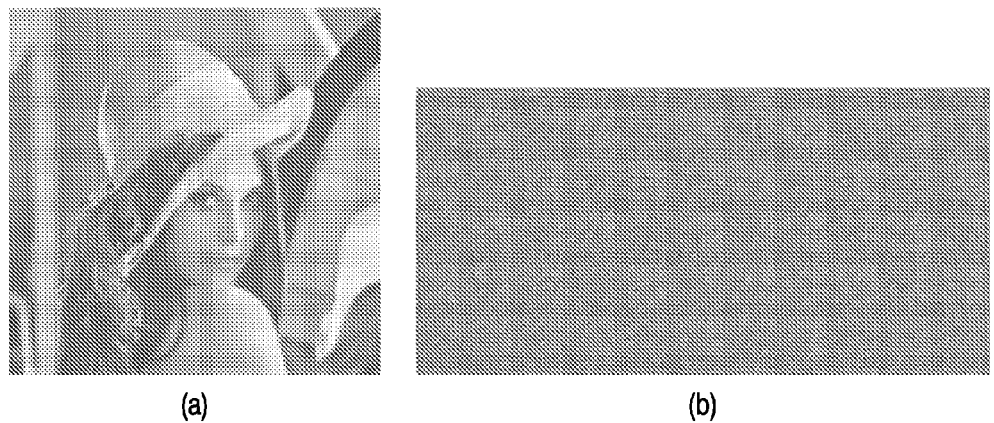
Figure 7:
Figure 7:
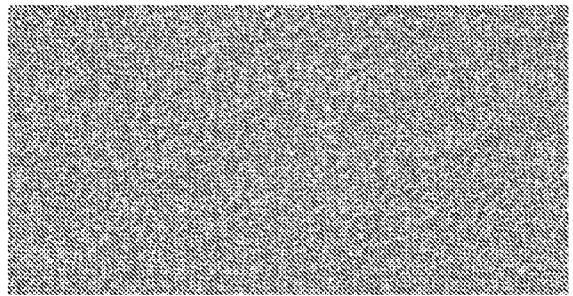
Figure 8:
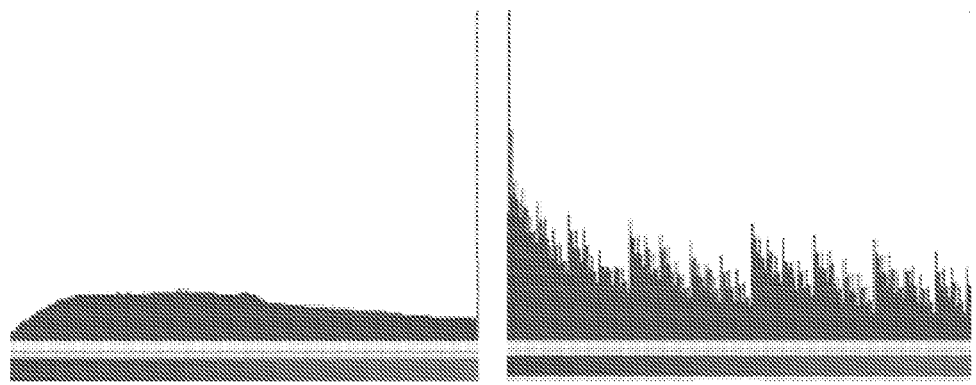
Figure 9:
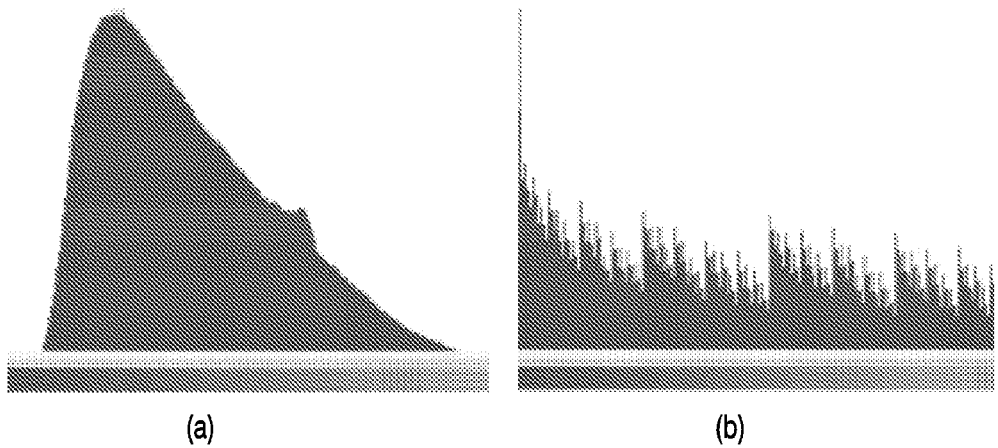
Figure 10:
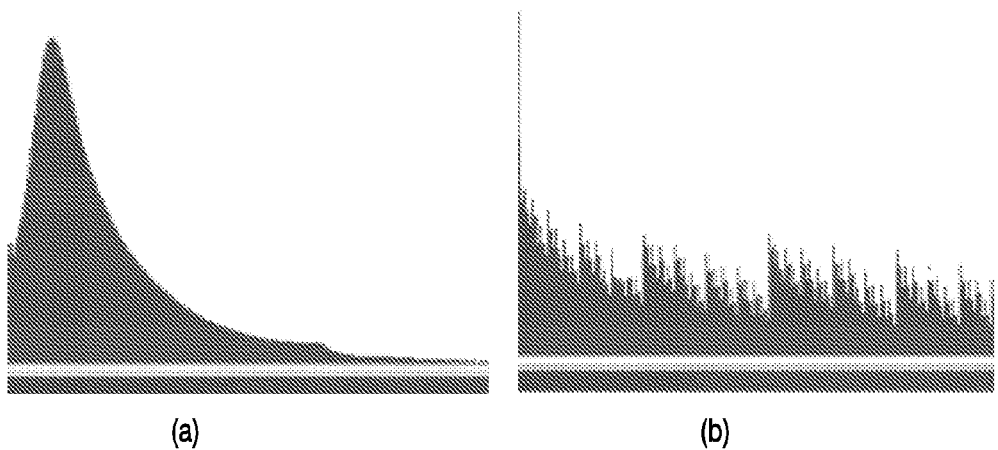
Figure 11:
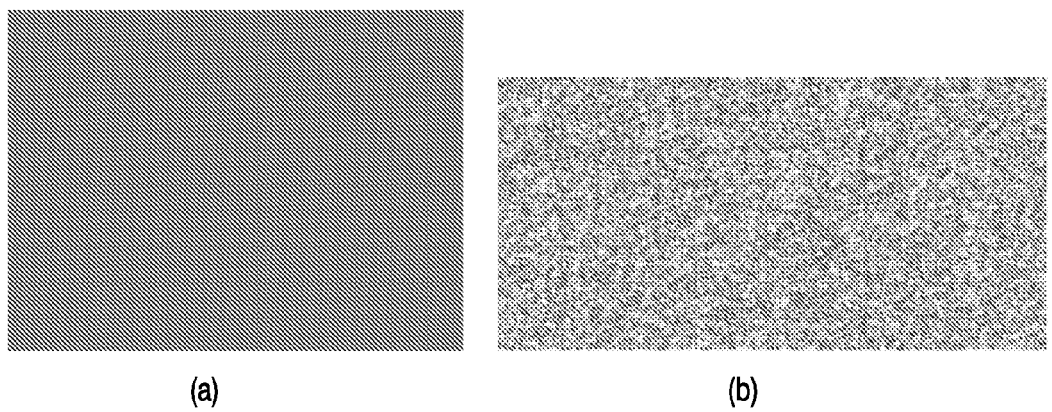

There now follows a description of preferred embodiments of the invention, by way of non-limiting example, with reference being made to the accompanying drawings in which:
   FIG. 1 illustrates encryption of an exemplary colour image;
   FIG. 2 depicts an exemplary byte pattern in position tuple form;
   FIG. 3 depicts the cryptanalytic error avalanche effect of a missing byte from the byte pattern of FIG. 2;
   FIG. 4 depicts the relationship between PI values for 25 different ciphertexts in the form of percentage inequality for the image of FIG. 6a;
   FIG. 5 illustrates the change in ciphertext size due to small changes in an encryption key in the form of variation in dimensions of the encrypted image;
   FIG. 6 illustrates encryption of an exemplary image: (a) Original Image, (b) Encrypted Image;
   FIG. 7 illustrates encryption of an exemplary image: (a) Original Image, (b) En-crypted Image;
   FIG. 8 illustrates a histogram of the red component of the original and encrypted images of FIG. 7;
   FIG. 9 illustrates a histogram of the green component of the original and encrypted images of FIG. 7;
   FIG. 10 illustrates a histogram of the blue component of the original and encrypted images of FIG. 7;
   FIG. 11 illustrates encryption of a single colour image: (a) Original Image, (b) Encrypted Image;

1 INTRODUCTION

Pixels in an image are essentially constituted of two properties, position and colour. Pixel Property Separation, a radically different approach for Symmetric-key image encryption, separates these properties to disturb the semantics of the image. The versatility of the algorithm disclosed herein is in its applicability to any form of digital data. The scheme operates in two orthogonal stages each requiring an encryption key. The first stage creates the Position Vector, an ordered set of Pixel Position Information controlled by a set of Random Colour Permutations. A bitmap flagging the presence of all the 24 bit colours is generated. The second stage randomly positions the image width and height within the ciphertext and finally applies a byte transposition on the ciphertext bytes. The complete set of image properties including width, height and pixel position-colour correlation are obscured, resulting in a strong degree of encryption. The orthogonality of the stages makes cryptanalysis more difficult because information retrieved from compromising one stage is independent and cannot be used to derive the other stages. Classical cryptanalytic techniques demand huge number of attempts, most failing to generate valid encryption information. Linear and Differential cryptanalysis are highly inefficient due to high Diffusion and Confusion.

An image encryption technique and algorithm based on Pixel Property Separation is de-scribed herein, in which the pixel position and the colour are separated and encoded. The algorithm conceals the image colour-position correlation, the colour information and the image size. The concealment of the image size considerably enhances the cryptanalytic complexity. The Ciphertext only attack is practically impossible while the plaintext and the differential attacks fail to reveal useful encryption information. The time required for a successful Brute Force Attack is of order of billion years, hence it is not likely to be broken by brute force methods using any existing technology.

The organization of the following sections is as follows. Section 2 specifies the encryption and the decryption algorithms. It also provides the mathematical model and illustrates the encryption technique. Section 3 explicates the various cryptanalytic attacks and the unit operations required to compromise the encryption. Section 4 discusses the computational space and time complexity of the algorithm. Section 5 provides a qualitative assessment of the encryption strength, and appraises the technique against various cryptographic strength criteria. Section 6 presents simulation results.

2 The Algorithm

Let img denote a colour image of size W×H pixels with width W, height H and (W×H)≧1, img(x,y), 0≦x<W, 0≦y<H, being the 24 bit RGB level of img at the position (x,y). The proposed encryption scheme is as follows.

2.1 Definitions and Assumptions

1. The pixels of the image img are always scanned from Left to Right and from Top to Bottom, as in a Raster Scan.
2. $S=\{img(x,y), \forall 0 \leq x < W, 0 \leq y < H\}$, the set of all colours present in img
3. Function a is such that $a(i)$, $\forall 0 \leq i < 2^{24}$ RGB levels, denotes the number of pixels of level i. It can be noted that $0 \leq a(i) < W \times H$
4. Function p indicates the presence of any colour in img.

$$p(i) = \begin{cases} 1, & S \cap \{i\} \neq \Phi \\ 0, & S \cap \{i\} = \Phi \end{cases}$$

$\forall 0 \leq i < 2^{24}$ colour values

5. Function c is such that $c(i)$, $\forall 0 \leq i < 2^{24}$ RGB levels, denotes a number ne, such that, at any point of the scan, exactly ne number of pixels of level i have been processed. Note that, $$\begin{cases} 0 \leq c(i) \leq (a(i)+1), & p(i) = 1 \\ c(i) = 0, & p(i) = 0 \end{cases}$$

6. RP (KEY, n, l), KEY ∈ R, the set of all Reals, n, l ∈ $Z^+$, defines the $(n+1)^{th}$ Random Permutation generated using the key KEY, having l numbers, where any $j^{th}$ element RP(n)[j] be such that $0 \leq RP(n)[j] < [j] < l$, $\forall 0 \leq j < l$
7. $NRP^1 \in Z^+$ is the number of Random Permutations required to process all the W×H pixels of img such that exactly one pixel of any colour C∈S is processed per permutation.

[1] See Appendix for derivation

8. For any tuple T, $T_n$ represents the $n^{th}$ element of T and sz(T), the number of elements in T
9. $W_1$ and $H_1$ respectively represent the least significant, $W_2$ and $H_2$, the most significant bytes of W and H.
10. bw and bh respectively represent the least number of bits required to represent the width w and height h of any pixel img(w, h).
11. D-GAP[9], a variant of classical Bit Run Length Encoder, encodes the first byte with the value of the first bit in the sequence, the subsequent bytes alternatively encode the runs of 1s and 0s (0s and 1s). The second byte encodes the run of the bit type represented by the first byte. All examples in this paper, use D-GAP for Run Length Coding.

2.2 The Encryption Algorithm

The Encryption scheme is a 2 key Secret Key Algorithm. It operates on the input plain image img with W×H pixels, the two keys key1 and key2 and generates the encrypted image img' with $(W' \times H')^1$ pixels. The following steps define the algorithm:

Step 1: Generate $$CP(n)=RP(key1,n,2^{24}), \forall 0 \leq n < NRP$$

Step 2: Create the Position Tuple $$Pos=[Pos_0, Pos_1, \ldots, Pos_{W \times H-1}]$$

as follows. Execute for colour q=CP(n)[j]

1. $c(q) = c(q) + 1$, if $(p(q) = 1) \wedge (c(q) \leq a(q))$

2. $Pos_k = \begin{cases} (w_{c(q)}, h_{c(q)}, 0), & p(q) = 1 \wedge c(q) < a(q) \\ (w_{c(q)}, h_{c(q)}, 1), & p(q) = 1 \wedge c(q) = a(q) \end{cases}$ under the following conditions:
1. $\forall 0 \leq j < 2^{24}$ repeated $\forall 0 \leq n < NRP$ (C1)
   k takes values 0, 1, ..., m for any $0 \leq m < W \times H$
2. $\forall 0 \leq j < 2^{24}$ repeated $\forall m < k < W \times H$ (C2)

where $w_{c(q)}$ and $h_{c(q)}$ represent respectively the width w and the height h of the $c(q)^{th}$ pixel of img such that img ($w_{c(q)}, h_{c(q)}$)=q.

For convenient digital representation, create Pos' from Pos, a tuple of sz(Pos') bytes where each $Pos_k$ is represented as a sequence of $(bw+bh+1)^1$ binary bits.

$$Pos'=[Pos'_0, Pos'_1, \ldots Pos'_{sz(Pos')-1}]$$

Step 3: Create the Colour BitMap CBM, a tuple of $2^{24}$ elements (bits). $CBM=[B_0, B_1, \ldots, B_{2^{24}-1}]$, where any $B_i = p(CP(0)[i]), \forall 0 \leq i < 2^{24}$.

Step 4: Run Length Encode CBM to create RCBM, a tuple of b bytes.

$$RCBM=RLE(CBM)=[B'_0, B'_1, \ldots, B'_{b-1}]$$

Step 5: Create a tuple of (sz(Pos')+b) bytes.

$$PB=[Pos'_0, Pos'_1, \ldots, Pos'_{sz(Pos')-1}, B'_0, \ldots, B'_{b-1}]$$

Step 6: Let (f)[1] be the size of the encrypted image. Generate TP=RP (key2, 0, f), SP=RP(key2, 1, f) and PP=RP(key2, 2, sz(PB))

Step 7: Let (p)[1] be the number of padding bytes in the encrypted image. Create P, a tuple of p bytes, where any $P_i=PB_{(PP[i])}$ $$P=[P_0, P_1, \ldots, P_{p-1}]$$

Step 8: Create a tuple of (sz(PB)+p) bytes.

$$PB'=[PB, P_0, P_1, \ldots, P_{p-1}]$$

Step 9: Insert $W_1$, $W_2$, $H_1$ and $H_2$ within tuple PB', at positions indicated by the following Table, to create PF, a tuple of (sz(PB')+4) bytes.

| Byte | Position |
|------|----------|
| $W_1$ | SP [0] |
| $W_2$ | SP [1] |
| $H_1$ | SP [2] |
| $H_2$ | SP [3] |

Step 10: Create F, a tuple of $$f=(W' \times H' \times 3)=(sz(PB')+4)$$

bytes, where any $F_i=PF_{TP[i]}$ $$F=[F_0, F_1, \ldots, F_{f-1}]$$

Step 11: Create encrypted image img' of size W'×H':

$$img'(x,y)=[F_i, F_{i+1}, F_{i+2}]$$

represented as a 24 bit number with $F_i$ being the MSB, where i=(x×W'×3)+(y×3), ∀0≦x<W', 0≦y<H'

2.3 Algorithm Illustration

Consider a system of 16 colours $C_0$ through $C_{15}$ and let img be a colour image with W=3 and H=3, composed of a set of 6 colours, S={$C_1, C_3, C_5, C_6, C_{11}, C_{12}$}. FIG. 1 depicts the image img with NRP value 2 and defines CP(0), CP(1), PP and SP.

Functions a, p and c (initial values) take the following form.
1. p: [0,1,0,1,0,1,1,0,0,0,0,1,1,0,0,0]
2. a: [0,2,0,3,0,1,1,0,0,0,0,1,1,0,0,0]
3. c: [0,0,0,0,0,0,0,0,0,0,0,0,0,0,0,0]

The $i^{th}$ element of functions p, a and c gives the value of the corresponding function for the input colour $C_{i-1}$.

Create Pos':
1. n=0, c: [0,1,0,1,0,1,1,0,0,0,0,1,1,0,0,0]
    Pos: [(2,2,1),(1,2,1),(0,0,0),(1,1,1),(2,1,1),(0,2,0)][1] (A)
    [1]End of CP(0)
2. n=1, c: [0,2,0,2,0,1,1,0,0,0,0,1,1,0,0,0]
    Pos: [(2,2,1), \ldots ,(0,2,0),(1,0,0),(0,1,1)][2] (B)
    [2]End of CP(1) and (C1)
    At this point k=m=7.
3. n=1, c: [0,2,0,3,0,1,1,0,0,0,0,1,1,0,0,0]
    Pos: [(2,2,1), \ldots ,(0,1,1),(2,0,1)][3] (C)
    [3]End of (C2)
4. bw=bh=2
Pos': [171, 64,185,145, 3, 136][4], sz (Pos')=6
    [4]End of Step 2

Create RCBM:
1. CBM: [1,0,1,1,0,0,1,0, 1,0, 0, 1,0, 0, 0,0, 0]
2. RCBM: [1,1,1,2,1,1,1,1,2,1,5], b=11
Create P:
1. PB: [171,64,185,145,3,136,1,1,1,2,1,1,1,1,2,1,5]
2. p=3, P=[1,64,1]
Create PB':
1. PB': [171,64,185 \ldots , 2,1,5,1,64,1]
Create PF:
1. $W_1$=0, $W_2$=3, $H_1$=0, $H_2$=3
2. PF: [0,171,64,185,145,3,3,0,136,1,1,1,2,1,1,1,1,2, 1,5,1,64,1,3]
Create F:
1. W'=2, H'=4,f=24
2. F: [1,0,3,5,171,1,1,185,2,145,1,1,64,3,1,64,3,2,1,1,136, 1,1,0]
Create img':

| (x, y) | 0 | 1 |
|--------|---------|---------|
| 0 | 65539 | 371457 |
| 1 | 112898 | 9502977 |
| 2 | 4195073 | 4195074 |
| 3 | 65928 | 65792 |

The encryption process results in an image img' with width W'=2 and height H'=4.

2.4 Algorithm Description

The algorithm operates on the plaintext img and the keys key1 and key2 to create the ciphertext img'. For a better understanding of the algorithm, we represent the plaintext as depicted in FIG. 1.2 where pixels are grouped based on their colour. The plaintext is initially scanned to group pixels based on their colour. In the process, functions p and a are populated by counting the number of pixels of each of the $2^{24}$ colours. As specified, function p indicates the presence of each of the $2^{24}$ colours, and function a indicates the number of pixels bearing a particular colour. The proposed scheme, in Step 2, arranges pixel position information based on the order of colours dictated by the colour permutations. In each iteration of Step 2, the current colour q=CP(n)[j] in the current colour permutation CP(n) is chosen (Refer Section 2.2), and the position (width and height) of exactly one pixel bearing colour q is placed in the ciphertext, if such a pixel is available for processing. The pixel to be processed in any such iteration is decided based on the current colour q=CP(n)[j] and the number of pixels bearing colour q that have been processed in previous iterations. Function c keeps track of the number of pixels of each colour q that have been processed at any point. Note that in the illustration, initially $c(C_3)$=0, $c(C_3)$=1 at point (A) indicating that the first pixel bearing $C_3$, img(0, 2) has been processed. $c(C_3)$=2 at (B) and $c(C_3)$=3 at (C), indicating the processing of the second pixel (img(1, 0)) and the third pixel (img(2, 0)) respectively.

The order of pixel positions placed in the ciphertext depends on the order of the colours in the colour permutations CP(0) through CP(NRP−1). At point (A) in the illustration, the positions of the first set of 6 pixels (indicated by CP(0) in FIG. 1.2) bearing 6 different colours have been placed in Pos in the order defined by CP(0) (Refer FIG. 1.3). At point (B), the positions of the second set of pixels indicated by CP(1) are placed in the ciphertext in the colour order defined by CP(1). The colour order for the pixels is of importance only if pixels bearing at least two colours are considered. Note that when pixels bearing a single colour are available for processing, no colour order can be defined among the pixels, invalidating the necessity of a colour permutation. For example, in FIG. 1, it can be noted that only 2 colour permutations suffice. The Pixel img (2, 0), being the last of the pixels bearing colour $C_3$ does not need a colour order. The value NRP (Number of Random Permutations) makes sure that there are enough colour permutations to define an order for the pixel position information, until there are pixels to be processed in the plaintext bearing at least two colours. Step 1 generates NRP number of colour permutations with key1 as the seed.

The main focus of the algorithm is to split the two properties, the pixel colour and position of the plaintext. Steps 2 and 3 achieve this. In Step 2, for each colour $q=CP(n)[j]$ of a colour permutation $CP(n)$, (starting from $n=0, j=0$ to $n=NRP-1, j=2^{24}-1$), it is verified if there is a pixel of that colour available for processing, creating an entry of its position in the Pos tuple, if present. The check $p(q)=1$, verifies if there are any pixels of that colour in the plaintext and the check $(c(q)<=a(q))$ verifies if all the pixels of that colour have been processed or not. Condition (C1) uses the colour permutations to process all the pixels which require a colour order. Condition (C2) processes any remaining pixels that belong to a single colour and do not require a colour order. If (C1) processes m out of (W×H) pixels, there remain exactly (W×H−m) pixels of a single colour to be processed by (C2). Note that condition (C2) is not mandatory. In FIG. 1, if the pixel $img(2, 0)=C_5$, then (C1) processes all the plaintext pixels. FIG. 1 indicates the colour permutation and the conditionunder which the plaintext pixels are processed. k is sequentially incremented for each pixel entered in the Pos tuple. Note that the final value of k is (W×H)−1.

Each entry of the Pos tuple is composed of three elements. The width and the height of the pixel considered, and a flag to indicate whether it was the last pixel of that colour available for processing. The flag is set to 1, if it is the last pixel, else it is set to 0. The condition $(c(q)=a (q))$ indicates that the last pixel of colour q is being processed. To keep track of the number of pixels processed of a particular colour q, c (q) is incremented as each pixel of colour q is entered in the tuple.

Each entry in Pos is digitally represented using $(bw+bh+1)$[1] binary bits to create the tuple Pos'. For example, consider the first two pixel position entries of the Pos' tuple in the illustration. Partial Pos tuple $Pos_p$: [(2,2,1),(1,2,1)]. Since $bh=bw=2$, each of the width or the height take 2 bits. Hence, (2,2,2) is represented as 10101 and (1,2,1) as 01101. The bit representation of $Pos_p$ is [1010101101]. The first 8 bits, 10101011, with a decimal value of 171, forms the first element of Pos'. The remaining two bits are considered as the most significant bits of the second element. The same technique is applied to all the elements of Pos. Finally, Pos' is padded with '0's to complete the last byte.

[1]Refer Appendix for derivation

In Step 2 only the pixel position information was considered. However, for correct de-cryption of the ciphertext, it is necessary to remember what colours compose the plaintext. For each colour q in CP(0), a bit entry $B_q$ is made in CBM indicating the presence of colour q in the plaintext. $B_q=1$ if q is present, else $B_q=0$. CBM is composed of $2^{24}$ bits, which is Run Length Encoded in Step 4.

It can be noted that the pixel position and the pixel colours have been divided into two seperate tuples, Pos' and CBM. Also, the colour information is totally encoded in the cipher text as a compressed bitmap. The most important information that defines the semantics of an image, the colour-pixel correlation, is obscured, rendering any kind of cryptanalysis practically impossible.

It is apparent from the above description that the resulting ciphertext size deviates from the original. But to decode the tuple Pos', the knowledge of W and H is necessary and hence the original size has to be part of the ciphertext. The complexity of decryption greatly increases if the original size parameters are concealed. The best way to conceal is to randomly place $W_1$, $W_2$, $H_1$ and $H_2$ in the ciphertext. Step 9 generates a random permutation SP. The first 4 entries of SP are used as byte indicies for positioning the size bytes within the ciphertext.

The tuple PB, along with the 4 size bytes may not form a rectangular image, even if it forms, the size may not be a multiple of 3. Tuple PB needs to be padded to make W', H' and (sz(PF)/3), integers. The values of the p padding bytes should be chosen such that it never aids the cryptanalyst in correctly reverse transposing F to PF. For example, if the first p bytes of PB are used, $$P=[PB_0, PB_1, \ldots, PB_{p-1}]$$

or if they are chosen such that, for any positive integer x, $$P=[x, x+5, x+10, \ldots]$$

then there is a possibility that the transposition of Step 10 is easily compromised since they follow a pattern. Hence, the values for the padding bytes have to be randomly chosen, preferably, from tuple PB, to further complicate cryptanalysis. The values of the permutation PP are used as byte indices for choosing values for tuple P.

Tuple PB' is created by concatenating the padding tuple P with tuple PB. The 4 size bytes are then inserted using SP as described earlier. As the last step of the algorithm, the tuple PF is transposed to create F, based on a random permutation TP of f numbers, generated using key2. Finally, the ciphertext is formed by interpreting sets of 3 bytes as 24 bit colours. This process results in an image img' of size W'×H', each pixel composed of 3 bytes.

2.5 Decryption Algorithm

The decryption process starts with the generation of TP and SP using (f) and key2. The set of colour permutations CP(0) through CP(NRP−1) cannot be pregenerated since NRP is not part of the ciphertext. The colour permutations have to be generated during the process of the decryption. It is known from the previous sections that the colour permutations are necessary only when pixels bearing at least two colours are available for processing. The decryption process can decide to stop generating colour permutations when the number of available colours NAC becomes 1. The initial value of NAC is equal to the number of 1's in the tuple CBM. For simplicity, we use the term NRP in the specification. The ciphertext img' is considered as a byte vector F for decryption.

Step 1: Create PF such that $$PF_{TP[i]}=F_i, \forall 0 \leq i < W' \times H'$$

Step 2: Extract $W_1$, $W_2$, H1 and $H_2$ from positions SP[0] through SP[3] respectively, to derive tuple PB'. Derive W and H. Calculate bw and bh Step 3: Calculate sz (Pos'). Separate Pos' from PB'.

Step 4: Pick bytes from the rest of PB' to decode RCBM until there are $2^{24}$ bits to form CBM. Discard remaining bytes which form the padding tuple P.

Step 5: Use CBM to derive NAC and p(i), $\forall 0 \leq i < 2^{24}$

Step 6: Create Pos from Pos' as follows:

$$Pos_k=(w_k, h_k, flag_k), \forall 0 \leq k < W \times H$$

where,
1. $w_k$ is the value of the first bw bits of $Pos'_k$
2. $h_k$ is the value of the next bh bits of $Pos'_k$
3. $flag_k$ is the value of the last bit of $Pos'_k$
Discard if any padding bits remain.

Step 7: Create plaintext img as follows: Execute
1. img $(w_k, h_k)$=q, if p(q)=1
2. p (q)=0, NAC=NAC−1, if $flag_k$=1 where q=CP(n)[j], under the following conditions:
1. $\forall 0 \leq j < 2^{24}$ repeated $\forall 0 \leq n < NRP$.
   k takes values 0, 1, . . . , m for any $0 \leq m < W \times H$
2. $\forall 0 \leq j < 2^{24}$ repeated $\forall m < k < W \times H$ The decryption process results back in the plaintext img of size W×H, each pixel composed of 3 bytes.

3 Cryptanalysis

This section explicates the different techniques for cryptanalysis. The Brute Force and the Plaintext attacks have been analysed. Differential Cryptanalysis has been discussed as part of Section 5.3.

3.1 Brute Force Attack

In a Brute Force Attack, the algorithm implementation is considered as a black box and all valid key combinations are attempted until the correct key is discovered. The complexity of such an attack depends on the size of the keys used for encryption.

Key Size Key1: The size of the Key1 depends on the fact that for any set N with n elements there are ((n!)!) different possible arrangements of the (n!) permutations composed of the n numbers of the set N. For example, for $N_3=\{1, 2, 3\}$, there can be (3!=6) permutations possible.

| A | B | C | D | E | F |
|---|---|---|---|---|---|
| 1 | 1 | 2 | 2 | 3 | 3 |
| 2 | 3 | 1 | 3 | 1 | 2 |
| 3 | 2 | 3 | 1 | 2 | 1 |

Further, there can be (6!) different arrangements of these 6 permutations. {A, C, D, E, F, B,}, {A, D, E, F, B, C,} and so on. Hence for the set $N_3$ there are ((3!)!) different arrangements of the (3!) permutations. For 24 bit colours, there are $2^{24}$ different colours possible and there can be (($2^{24}$!)!) different arrangements of the ($2^{24}$)! colour permutations. Hence, the maximum size in bits of Key1, $NBK_1$, is $\log_2(((2^{24}!)!))$. However, different implementations can choose different values for $NBK_1$ depending upon the security requirements.

Key Size Key2: Since Key2 is used to generate PP, SP and TP, unlike Key1, whose maximum size depends on a constant, the size of Key2, $NBK_2$, depends on the ciphertext size (f=W'×H'×3), which is a variable entity. But, the size of Key2 can be chosen independent of the ciphertext size. This is because, even though the number of bytes (f) that finally need to be permuted is plaintext/ciphertext dependent, the Random Permutation Generator generates one of the $2^{NBK_2}$ random permutations of (f) numbers.

In the proposed scheme, it is not possible to individually determine Key1 or Key2 during decryption. This is because the correctness of the decryption attempts involving Key1 or Key2 cannot be determined until the entire decryption process is complete. Hence, on average, $2^{NBK_1+NBK_2-1}$ attempts are required to successfully compromise the keys.

Also, In the proposed scheme, the presence of any colour in the plaintext is flagged as a bit in the tuple CBM. In Step 5 of the decryption process, the function p is populated to mark the presence of the plaintext colours. As each element $Pos_k$ is considered for decryption, if the pixel $img(w_k, h_k)$ bearing the colour q is the last pixel of that colour (indicated by $flag_k$=1), then p(q) is set to 0, indicating that there are no more pixels of colour q available for processing. In the next colour permutation, the colour q is discarded. The information as to what colours have to be discarded in CP(n) is known only after all the colours q=CP(n−1) [j] of the previous colour permutation CP(n−1) have been considered for processing. Hence, decryption is a sequential process and can not be parallelized. Unlike algorithms like DES and AES, the ciphertext in the proposed scheme can not be split into blocks that can be parallely decrypted. This greatly increases the complexity of the Brute Force Attack.

On a 1.83 GHz Intel Centrino Duo machine with 1 GB RAM, a basic implementation of this decryption scheme takes about $\Delta t$ 5 seconds for decrypting the image in FIG. 6. Considering faster machines, $\Delta t$=0.005 seconds. Considering $NBK_1=NBK_1=64$, it takes $27 \times 10^{27}$ years on average to break the encryption.

3.2 Ciphertext Only Attack

This method considers the different stages in the decryption process and determines the candidates for each stage, The right set of candidates will successfully decrypt the plaintext. The decryption process consists of the following stages.

Reverse Transposition is the process of deriving PF from the transposed encoded byte vector F. Since sz(F) is f bytes, there are (f)!possible arrangements, one of them being F itself. Therefore there are (f)!−1 different candidates for PF. Since the values of the bytes in F are random numbers, there is no specific signature or references that can prove the validity of the reverse transposition result as a candidate for PF. Hence, only after the entire decryption process that the validity of any reverse transposition result be proved. The average number of complete decryptions to successfully get the correct solution for this stage is (f!−1)/2.

Derivation of W and H involves the extraction of the randomly placed 4 size bytes $W_1$, $W_2$, $H_1$ and $H_2$ in PF. Since W and H are unknown, all possible width and height values have to be considered for decryption. There are $(^fP_4)$ ways of choosing 4 out of a set of f bytes. Since 2 bytes represent W or H, the plaintext can have a maximum of 65536×65536 pixels, which is not the case always. If the plaintext supports a maximum size of 4096×4096, then the most significant byte of the width and the height cannot exceed the threshold value of 16. All values that exceed this threshold in the higher byte can be discarded. Also, the set of bytes which result in a value 0 for any of the W or H can be discarded. This knowledge assists in eliminating all invalid byte combinations as candidates for this stage. Assuming that there are z bytes with value zero and a bytes with value greater than the threshold and if, 1. M is the no. of combinations such that W or H=0
2. T is the no. of combinations such that $W_2$ or $H_2$>t
3. MT is the no. of combinations satisfying both the above conditions the number of valid candidates for this stage is given by $$V = {^f}P_4 - M - T + MT^1 \quad (1)$$

[1]See Appendix for derivation where, $$M = {^z}P_4 + 4(f-z)({^z}P_3) + 2({^z}P_2)({^{f-z}}P_2)$$

$$T = {^u}P_4 + 4(f-u)({^u}P_3) + 5({^u}P_2)({^{f-u}}P_2) + 2(u)({^{f-u}}P_3)$$

$$MT = 2(u)(f-u)({^z}P_2) + 2({^z}P_2)({^u}P_2)$$

MT is added because these combinations are internally eliminated twice in the equation, once in M and one more time in T.

Position Vector Decoding and Image Reconstruction involves the identification of the vectors Pos and CBM. The size bytes retrieved can be used to identify the tuple Pos' and hence Pos. The remaining ciphertext bytes can be used to derive CBM (Steps 2, 3 and 4 of Section 2.5). This Image Reconstruction process uses a set of random colour permutations CP(0) through CP(NDP−1) and the Colour Bit Map CBM to match each $POS_k$ with its colour (Steps 5, 6 and 7 of Section 2.5). NDP is the number of colour permutations required to reconstruct the plaintext in any decryption attempt and takes different values for different attempts. Note that for a successful decryption attempt NDP=NRP. And colours are three byte values (RGB), so for each colour permutation, there are $(2^{24})!$ candidates. If $NDP_{avg}$ is the average number of colour permutations required for any decryption attempt, averaged over a large number of attempts, then on average, this process requires a total of $(2^{24}\ !\times NDP_{avg})$ candidate colour permutations to be used for each decryption attempt.

Since the value of NRP is unknown, the number of colour permutations required can vary from 1 to (W×H)/2, depending on the number of colours and the pixels in the plaintext.[2]

[2] NRP for images with only one colour or all the $2^{24}$ colours is 1. Images composed of only 2 colours $C_1$ and $C_2$ such that $a(C_1)=a(C_1)=(W\times H)/2$ result in the maximum value of (W×H)/2 for NRP.

Verification is the last stage of the attack and cannot be automated due to the absence of the reference image. Hence, verification of the decrypted image has to be done manually by viewing the image for correctness.

It shall be noted that none of the stages can be validated for correctness individually. Rather, for each attempt in each stage, it is necessary to complete the entire decryption process to verify their validity. Hence, the time required for a successful attack is not the sum of the time required for each stage but their product.

Let the time taken for completing a single trial of each stage be respectively $\Delta_1, \Delta_2, \Delta_3$ and $\Delta_4$, then the Worst Case Time required to successfully decrypt the ciphertext with the correct set of candidates of all the stages is CA, given by $$CA = ((f!-1)\Delta_1 \times (V\Delta_2) \times (2^{24}!)(NDP_{avg})\Delta_3 \times \Delta_4) \quad (2)$$

On average, CA/2 time units are required to successfully decrypt the ciphertext. Because of the multiplication of time needed for each stage and excessively large number of iterations, it is highly impractical to break this algorithm without necessary information.

3.3 Chosen Plain Text Attack

The goal of Chosen Plain Text Attack (CPTA) is to reveal encryption information like the set of Colour Permutations CP(0) through CP(NRP−1), the Transposition Per-mutation TP, Permutation SP and the Padding Permutation PP. The cryptanalyst has the knowledge of the algorithm and is provided with an Encryptor that can encrypt any input plaintext with keys key1 and key2. The cryptanalyst has the ability to fabricate arbitrary plaintexts, which, when encrypted have the potential to reveal encryption in-formation. Though the intention of a typical CPTA is to reveal the encryption keys, in the proposed scheme, retrieval of keys key1 and key2 from CPs, TP, SP and PP is immensely complex. Since the generation of Random Permutations involve the usage of the keys as seeds of a Pseudo Random Number Generator (PRNG), the process of key generation starting from the permutations is practically impossible.

By the definitions of Generic Permutation RP, and permutations TP, SP and PP, it shall be noted that the latter three permutations depend on parameters which are derived based on the properties of the input plaintext. Also, for a given key, the PRNG generates different permutations for different l values. Hence, the revealed permutations TP, SP and PP are rendered useless since they cannot be applied for other images. As a result, the only useful encryption information that the CPTA can potentially reveal is the set of Colour Permutations. The rest of this section describes different approaches for CPTA.

Consider an input plaintext $img_1$ with W=H=1. The only pixel in the image, identified by $img_1(0, 0)$, bears the colour C. Let $img'_1$ be the encrypted image with width W' and height H', each of the W'×H' pixels bearing any of the $2^{24}$ colours. For such an image:

1. Pos: [(0,0,1)]
2. Pos': 00100000 (5 bits 0 padding)
3. NRP=1

The first step in cryptanalysis is the reverse transposition operation to derive PF from F. It can be noted that there are ((f)!) possible ways of reverse transposing F. But with the knowledge of Pos' and that it precedes any other byte in PF', all outcomes with the first byte value 00100000 are candidates for PF'. Since the first byte is fixed, the number of such outcomes are (f−1)!, a reduction by a factor of f. It is clear from the previous section that it is not possible to discern until the entire decryption is complete that which of the (f−1) !candidate outcomes is PF. Also, since the positions of the size bytes are unknown, the cryptanalyst has to choose a set of 4 bytes having the values 0, 1, 0, 1. The number of 1's and 0's in a candidate outcome depends on the plaintext, key1 and key2 and the specific RLE scheme used. Hence, these parameters determine the probability of the cryptanalyst choosing an invalid byte set which can potentially become a victim of the Cryptanalytic Error Avalanche Effect.[1] But since most part of PF for this image is RCBM, the maximum error an invalid size byte choice can introduce is the shift of the only 1 in the CBM, which further results in an incorrect position of C in CP(0). Assuming $W_1, W_2, H_1$ and $H_2$ are correctly chosen and removed from the candidate, what remains is tuple PB'.

[1] Refer Section 5.3

The cryptanalyst now has the task of deriving the position of C in CP(0), which can be any of the $2^{24}$ different possible positions.

It is apparent that only when the cryptanalysis results in $img_1$ that the correctness of the reverse transposition operation, choice of the size bytes and that of CP(0) can be proved. But in this attack, all the $2^{24}$ choices of CP(0) will result in $img_1$ rendering this attack useless. The following example explains this phenomenon.

Let one of the reverse transposition candidates take the following form,

F:[32,1,1,255,0,255 . . . ]

indicating that the Pos' value is 32, the first bit of the RCBM is 1, followed by a sequence of 510 0s and so on. Since the first element of CBM is 1, the attempt in which CP(0) has C as its first colour results in $img_1$. Similarly if,

F:[32,0,1,1,255,0,255 . . . ]

usage of a candidate CP(0) having C as its second colour results in img. Hence, with the above attack, it is not possible to uniquely determine the position of C in CP(0).

Consider input plaintext $img_2$ with W=2 and H=1. The two pixels in the image, identified by $img_2(0, 0)$ and $img_2(0, 1)$, bear colours C1 and C2 respectively. Let $img'_2$ be the encrypted image with width W' and height H', each of the W'×H' pixels bearing any of the $2^{24}$ colours. Depending on whether C1 appears before or after C2 in CP(0), the position vector takes the following form.

1. Colour order C1 C2
   (a) Pos: [(0,0,1),(0,1,1)]
   (b) Pos': 00101100 (2 bits 0 padding)

2. Colour order C2 C1
   (a) Pos: [(0,1,1),(0,0,1)]
   (b) Pos': 01100100 (2 bits 0 padding)
3. NRP=1

Since the cryptanalyst does not have the knowledge of CP(0), all reverse transposition results that have their first byte value either 00101100 or 01100100 become candidates for PF. In this case it is straight forward to determine the relative positions of C1 and C2. The occurence of a byte 00101100 reveals that the colour order is C1 C2 and of 01100100, colour order C2 C1. The cryptanalyst may get confused if both the bytes occur in the cipher text $img_2'$. In general, the cryptanalyst can determine the colour order only if there are no byte sequences in the ciphertext pertaining to other colour orders. In the case of $img_2$, since the plain text is made of only two colours, there can be only two is in CBM, with huge runs of 0s. As a result, the RCBM is composed of bytes with values 0, 1 and 255, making the probability of the occurence of both the above said bytes 00101100 and 01100100, almost 0.

It is impossible to derive the absolutepositions of C1 and C2 because of the reason explained in the previous attack, that multiple choices of CP(0) for decryption result in $img_2$.

Though the previous attack could not reveal the absolutepositions of C1 and C2, it reveals their relative positions. The relative position of a colour C3 with respect to C1 and C2 can be derived if an image $img_3$ with three pixels bearing C1, C2 and C3 is cryptanalysed. The following table maps the various Pos' values with the relative positions of the colours assuming C2 occurs before C1.

| Pos' | Colour Order |
|---|---|
| 01010011 00010000 | C3 C2 C1 |
| 00110101 00010000 | C2 C3 C1 |
| 00110001 01010000 | C2 C1 C3 |

It can be noted that for a given order of C1 and C2, C3 can take three different positions resulting in three different colour patterns and Pos' tuples. The cryptanalyst has to search for any of the byte patterns to derive the relative positions of the three colours.

It shall be noted that usage of an image with only C1 and C3 or C2 and C3 would have revealed C3's relative position with respect to only C1 or C2 respectively, while it is important to find the relative position of C3 w.r.t both C1 and C2. Hence, it is necessary to consider all the other n−1 colours when the relative position of a colour Cn in the permutation is being determined.

The above process can be extended for all the $2^{24}$ colours of a colour permutation CP, which in totality, reveals the absolutepositions of all the colours of CP. But it shall be noted that as the number of colours and pixels increase in the plaintext, this attack decays into a Brute Force Attack. This is because of the following reasons.

1. As the number of colours and the pixels increase, the entries in Pos' for each pixel spans more than a byte increasing the number, and the complexity of a byte pattern search that reveals the colour order.
2. The number of is in the CBM increases resulting in non-standard (values other than 0, 1 and 255) byte entries which further confuse the cryptanalyst in uniquely determining byte pattern and hence the colour order.
3. There are n different combinations of byte patterns that needs to be analysed to uniquely determine the relative position of the $n^{th}$ colour w.r.t n−1 other colours whose relative positions are already been determined, while it requires to analyse n! combinations of byte patterns, to reveal the relative positions of n colours, if the relative order of any of the n−1 colours is not known. The cryptanalyst is forced to cryptanalyse sequentially.
4. There is a high probability that a byte pattern specifying multiple colour orders exist in the ciphertext due to increase in the number of entries of the Pos tuple and non-standard byte values in RCBM. This confuses the cryptanalyst as to which order to choose to continue cryptanalysis.
5. The cryptanalyst not only has to analyse the ciphertext to reveal the colour order CP used, but has to further verify for byte patterns corresponding to other colour orders to indicate or invalidate their presence.

Hence, as the colours and pixels increase, the cryptanalytic complexity converges to that of a Brute Force Attack and in most cases fail to provide valid encryption information due to presence of bytes that specify multiple colour orders.

The above technique requires $2^{24}-1$ cryptanalytic attempts to reveal any colour permu-tation CP, each attempt, higher in complexity than the previous one, finally decaying to Brute Force Attack. The number of combinations of byte patterns that needs to be analysed to reveal a colour permutation is $A_1$, where $$A = 2 + 3 + \ldots + 2^{24} \quad (3)$$

The above attack, can be extended for multiple colour permutations. Consider a plaintext $img_4$ with H=W=2 composed of two colours C1 and C2, such that $img_4(0, 0) = img_4(0, 1) = C1$ and $img_4(1, 0) = img_4(1, 1) = C2$. Since there are two pixels each of the two colours, NRP=2, with permutation CP(0) processing pixels $img_4(0, 0)$ and $img_4(1, 0)$ and CP(1), pixels $img_4(0, 1)$ and $img_4(1, 1)$. If C2 preceds C1 in CP(0) and C1 preceds C2 in CP(1), then 1. Pos: [(1,0,0),(0,0,0),(0,1,1),(1,1,1)]
2. Pos': 10000001 11110000 (4 bits 0 padding)

If the cryptanalyst succeeds in finding the above mentioned byte sequence, then the relative order of colours C1 and C2 in both CP(0) and CP(1) is revealed. But there is a possibility that the cryptanalyst is confused if the search also results in a byte pattern pertaining to other colour order possibilities depicted in the table.

| Pos' | CP (0) | CP (1) |
|---|---|---|
| 10000011 10110000 | C2 C1 | C2 C1 |
| 00010011 10110000 | C1 C2 | C2 C1 |
| 00010001 11110000 | C1 C2 | C1 C2 |

For a plaintext image with three colours, there are $3^2$ ways in which colour C3 can be placed, provided the relative positioning of C1 and C2 in both the permutations are

| CP (0) | CP (1) |
|---|---|
| C1 C2 C3 | C2 C1 C3 |
| C1 C2 C3 | C3 C2 C1 |
| C1 C2 C3 | C2 C3 C1 |
| C3 C1 C2 | C2 C1 C3 |
| C3 C1 C2 | C3 C2 C1 |
| C3 C1 C2 | C2 C3 C1 |
| C1 C3 C2 | C2 C1 C3 |
| C1 C3 C2 | C3 C2 C1 |
| C1 C3 C2 | C2 C3 C1 | predetermined. If C1 preceds C2 in CP(0) and C2 preceds C1 in CP(1), the following table enlists the possible positions for C3.

In general, if an attempt is made to reveal the relative position of the $n^{th}$ colour in m different colour permutations, w.r.t n−1 different colours whose relative positions have been already determined in all the i colour permutations, one needs to analyse $n^m$ different byte patterns.

Though the number of attempts required to reveal CP(0) through CP(i) remains $2^{24}-1$, the number of combinations of byte patterns that needs to be analysed to reveal all in colour permutations is $A_m$, where $$A_m = 2^m + 3^m + \ldots + 2^{24m} \quad (4)$$

From the above set of attacks, it can be concluded that it is practically impossible to determine TP, SP, PP and CP since multiple combinations of TP and CP correctly decrypt the ciplertext, and that involves huge number of attempts, each being higher in cryptanalytic complexity than the previous ones, finally decaying to a Brute Force Attack, to reveal the possible set of colour permutations. Hence there is little or zero gain in the speed of cryptanalysis as compared to a Brute Force Attack.

3.4 Known Plain Text Attack

The goals and limitations of CPTA are applicable to Known Plain Text Attack KPTA. In a KPTA the cryptanalyst has the access to a plaintext image img and its corresponding ciphertext img'. The cryptanalyst has the following knowledge.

1. Original width W and height H
2. The colour value of each of the W×H pixels.
3. NRP Among the (f)! different ways of arranging the ciphertext bytes, the reverse transposition results which satisfy the following conditions, in the order specified, are candidates for the tuple PB.

1. The 4 size bytes extracted have values that of $W_1$, $W_2$, $H_1$ and $H_2$ respectively. It shall be noted that there are at least 1 or more such 4 bytes sets available.
2. The extracted tuple Pos has the following property.

$$w_k < W \text{ and } h_k < H \text{ of } Pos_k, \forall 0 \leq k < W \times H$$

3. The values of $w_k$ of any entry $Pos_k$ should have unique values ranging from 0 to W−1, and $h_k$ from 0 to H−1
4. Let s be the size of S, the set of all colours C present in the image. The first s entries in tuple Pos should provide position information of pixels bearing s distinct colours $C_0, C_1, \ldots C_s \in S$
5. The extracted and decoded tuple CBM is composed of exactly $2^{24}$ bits.
6. The tuple CBM has s number of 1s.

The rationale for condition4 is as follows. Each colour permutation processes only one pixel of any colour. The maximum number of pixels are processed by CP(0) since all the pixels are available for processing for the first colour permutation. CP(0) processes exactly s pixels.

For any image with size greater than 256×256, bw and bh are greater than 8. Hence the $w_k$ and $h_k$ values span across multiple bytes. To verify conditions 2, 3 and 4, bits have to be extracted from mutiple bytes involving huge number of bitwise operations and integer comparisons. Table 1 gives the approximate number of 16 bit Left Shift (LS), Right Shift (RS), AND and OR operations for various plaintext sizes, required to successfully verify if a candidate satisfies the aforementioned conditions.

It requires 4 integer comparisons per Pos entry to verify if condition 2 and 3 are satisfied and 1 comparison for the first s entries to verify condition4. Since there are W×H Pos entries, the number of integer comparisons IC is $$IC = 4(W \times H) + s$$

Verifying if a reverse transposition result is a valid candidate involves huge bit processing and integer comparisons and hence is time consuming.

TABLE 1

Plaintext Image size Versus Bitwise Operations
(table values to be multiplied by $10^4$)

| W × H | LS | RS | AND | OR |
|---|---|---|---|---|
| 4096 × 4096 | 5242.9 | 4404.0 | 1929.4 | 9646.9 |
| 512 × 512 | 62.3 | 68.8 | 262.2 | 131.1 |
| 256 × 256 | 13.9 | 172.0 | 62.3 | 31.1 |
| 640 × 480 | 76.8 | 76.8 | 307.2 | 153.6 |
| 1024 × 768 | 206.4 | 206.4 | 825.8 | 412.9 |
| 1000 × 200 | 47.5 | 52.5 | 200.0 | 100.0 |
| 234 × 1452 | 84.9 | 68.0 | 305.8 | 152.9 |

Since there can be multiple size byte sets for a reverse transposition result, for a worst case, the above verification has to be carried out for each such size byte choice of all the (f)!−1 (((f)!−1)/2 on average) possibilities. If for a plaintext image, B is the number of ways in which the $W_1$, $W_2$, $H_1$ and $H_2$ can be chosen, and Δ is the time to verify all the conditions for an attempt, then approximately $$(((f)!-1) \times 2B \times A)/2 \quad (5)$$

time units are required to derive the valid candidates for PB. The time Δ is halved since not all attempts require complete verification.

Let n<(W×H)! be the number of candidates for tuple PB. Since in this attack the colour of all the pixels is known, CBM and padding bytes can be discarded. Each of the n candidates for Pos' result in n different pixel orders and hence n different colour orders for permutations CP(0) through CP(NRP−1). There is no deterministic criteria for accurately deriving the colour orders, because, irrespective of the order of the Pos' entries, all the candidates result in correct decryption as the pixel colours are known. Also, even if the cryptanalyst succeeds in deriving the colour orders of all C E S by uniquely and correctly decrypting the ciphertext, the colour order of the other colours not present in the plaintext are unknown. Hence it is not possible to completely derive the colour permutations.

It is seen that the KPTA is unable to accurately determine the order of colours in the plaintext and also does not aid in determining the order of the colours not present in the image. The KPTA is rendered useless since the very purpose of the attack is defeated.

A minor change in the algorithm greatly increases the cryptanalytic complexity. Based on a random bit pattern of W×H bits, the decision of placing the pixel width or the height as the first entity of each of the (W×H) Pos entries is made. For example, bit value 1 for $k^{th}$ bit, results in $Pos_k = (h_k, w_k, (1/0))$ and $Pos_k = (w_k, h_k, (1/0))$, for value 0. This enhancement results in huge increase in the cryptanalytic complexity.

4 Computational Complexity

This section discusses the Computational Time and Space Complexity of the proposed scheme. The complexity of each stage is discussed to arrive at the overall complexity of the algorithm. The complexity of stages that do not depend on the image parameters are considered as O(1).

4.1 Time Complexity

The proposed scheme involves the generation and parsing of random permutations, generation of colour bitmap CBM, creation of Pos' by pixel position arrangement based on the colour orders and the transposition of the pre-final byte vector PF. This section discusses the best, average and the worst case complexities of the various stages, finally deriving the complexity of the algorithm.

The complexity of generating a random colour permutation CP with exactly $2^{24}$ colour values is O(1). The scheme requires a minimum of one and a maximum of $(W \times H)/2^1$ colour permutations. The best and the worst case time complexity of generating the colour permutations is $\Omega(1)$ and O (W×H). Since for any given image, only NRP number of colour permutations are used, the average case complexity is $\Theta(NRP)$.

[1] NRP for images with only one colour or all the $2^{24}$ colours is 1. Images composed of only 2 colours $C_1$ and $C_2$ such that $a(C_1)=a(C_1)=(W \times H)/2$ result in the maximum value of $(W \times H)/2$ for NRP.

Before the pixels are processed, they have to be grouped based on their colour, which requires the parsing of all the W×H pixels. The average and worst case complexity is O(W×H).

The creation of the Position Vector involves the parsing of all the $2^{24}$ colours of the NRP colour permutations. It takes O(1) time to parse each permutation. Hence the average and the worst case complexity of this stage is O(NRP). But not all pixels are covered by the CPs. Pixels belonging to a single colour are entered in the Position Vector independent of any permutation. The worst case complexity of this process is O(W×H). Hence the time complexity of entire Position Vector creation is $$O(NRP)+O(W \times H)=O(W \times H)$$

Creation of RCBM involves the parsing of $2^{24}$ different colours to verify if the colour is present in the image. Run Length Encoding need not be carried out as a separate activity, rather, the bits can be coded as the colour is being verified for presence. This process is of constant time with a complexity of O(1).

It shall be noted that the generation of permutations PP, SP and TP are of complexity $O(W' \times H' \times 3)$. The calculation of W' and H', and assigning values to the padding bytes are of linear time complexity and are insignificant. The insertion of the size byte set need not result in a shift of all the subsequent bytes. Such an insertion can be carried out during the implementation of the final byte transposition. Since the final byte transposition operates on $W' \times H' \times 3$ bytes, the complexity is $\Theta(W' \times H' \times 3)$.

It shall be noted that the final byte transposition has the maximum time complexity among all the stages since it involves the suffeling of $W' \times H' \times 3$ bytes. But, the value $W' \times H' \times 3$ linearly varies with the number of pixels W×H. This is because, there is a limit of $2^{24}$ bits on the size of the RCBM and the only varying entity is the Position Vector bits.

Since the time complexity of all the stages vary linearly with the plaintext size, the time complexity of the algorithm varies linearly with the number of pixels W×H in the image.

4.2 Space Complexity

The computational space requirements of the algorithm are discussed in-terms of the data structures used by the encryption process. The colour based pixel grouping can be represented using two different data structures, a linked list of S nodes (pointers), one for each colour $C \in S$, or an array of $2^{24}$ integer pointers indexed by the 24 bit colour. Each pointer, in both the structures, points to the list of pixels bearing the colour (Refer FIG. 1). There is a time-space trade off in choosing the data structure. Colour based pixel grouping is expensive in case of the linked list, as for each pixel bearing colour C, the list needs to be parsed to find the node pointing to C.

In the linked list approach, each node is composed of 3 entities, the colour, pointer to the pixel list and a pointer to the next node, requiring a total of 12 bytes. The array approach, requires 4 bytes for each pointer. Each pixel position representation requires two 16 bit intergers (4 bytes) since the maximum value for image width W or height H is 4096. If the colour indexed pixel groups are implemented as a linked list, a pixel representation also requires an integer pointer to point to the next pixel in the group. If an integer pointer is a 4 byte entity, the total number of bytes required to represent this data structure is $$(S \times 12)+8(W \times H)$$

for the linked list approach, and $$(2^{24} \times 4)+8(W \times H)$$

bytes for the array approach. Since the number of colours in S is O(W×H), the space complexity of this data structure is $\Theta(W \times H)$ The representation of the colour permutations is implementation dependent. The colour permutations can be represented in a single common buffer where the permutations are generated when required, used and discarded. If $\Delta_{cp}$ is the time required to generate a colour permutation, the execution time increases by $(NRP \times \Delta_{cp})$ in this case. Rather, all the NRP colour permutations can be pre-generated and stored in memory, requiring $$NRP \times 2^{24} \times 4$$

bytes. Since the maximum value of NRP is (W×H)/2, the space complexity is O (W×H). The space required for PP and SP can be shared with that of the CPs. If represented separately, the complexity is $\Theta(W \times H)$.

The number of bytes required to represent the ciphertext is $W' \times H' \times 3$. Due to the linear relationship between the plaintext and the ciphertext image size, the complexity of this data-structure is $\Theta(W \times H)$.

Since the space complexity of all the stages vary linearly with the plaintext size, the space complexity of the algorithm varies linearly with the number of pixels W×H in the image.

5 Strength of the Algorithm

The previous sections describe the number of unit operations and the time required to de-crypt the ciphertext based on the extent of information on the plaintext and the resources available for cryptanalysis. In the process, they also provide the Objectival Strength in terms of mathematical equations. This section provides the Subjectival Strength of the algorithm and comments on certain Cryptographic Algorithm Strength Criteria.

5.1 Pixel Property Separation

Consider that the cryptanalyst is in possession of key2. Then, the reverse transposition and the extraction of the size bytes can be successfully carried out, resulting in the tuple PB. The tuple PB contains the pixel position information and a combination of 1s and 0s indicating the presence of any of the $2^{24}$ colours, as part of CBM. Each entry of the pixel position information Pos, is composed of entities to describe only the positions of the pixel but not its colour. The entire Pos tuple consists of the position values of all the W×H pixels in the plaintext. This information is obvious since the cryptanalyst at this stage has the knowledge of W and H, and can derive the positions of all the pixels in the image. Since the tuple CBM is composed of bit values, it conveys no information as to the actual colours of the plaintext. Most part of the tuple PB contains information which is not of any use to the cryptanalyst. Hence, the value of each bit in the tuple PB is low. The cryptanalyst either has to fabricate key1 or attempt approximately $((2^{24})! \times NDP_{avg})$ colour permutations to generate the plaintext, rendering the algorithm, impractical to break.

If key1 is compromised, the cryptanalyst has the knowledge of the colour permutations used for encryption. The knowledge is rendered useless due to the lack of information regarding the size of the plaintext and hence that of Pos'. The tuple CBM and hence the set of colours present in the plaintext are unknown, making it impossible to discern the pixel position-colour association.

5.2 Plaintext Size Concealment

It is known from the previous sections that the algorithm results in a ciphertext size different from that of the plaintext. This property not only complicates cryptanalysis (Refer Section 3), but also aids in concealing the type of the image. Documents with standard size and template are fast becoming popular due the increase in the electronic processing of scanned documents. As a result, in many applications, it is necessary to conceal the plaintext size so that the document type is not revealed. A typical example is the exchange of biometric information between immigration agencies. The agencies follow a fixed template to transmit information like finger-prints and retina scans. Knowledge of the document size in this case can potentially reveal the nature of information transmitted and may lead to fabrication and impersonation. To avoid such vulnerabilities, it is necessary to conceal the plaintext size.

In general, a stream of A bytes encrypted in n blocks of sizes $A_1, A_2, \ldots, A_n$ would result in ciphertext blocks of sizes $D_1, D_2, \ldots, D_n$. Since each of the encrypted blocks result in a different size as compared to the corresponding plaintext block, it is impossible to assess the size of the original byte stream.

5.3 Cryptanalytic Error Avalanche Effect (CEAE)

The CEAE results in a decrypted image with huge errors for a small error during any stage of the decryption process. Since the entries of the tuples Pos and CBM are closely packed, a small error manifests into considerable deviations of the decrypted image from the original plaintext. For example, for a 512×512 image, 9 bits are required to represent any width or height. FIG. 2 depicts a byte pattern in Pos' of such an image and their usage in creating Pos entries.

During decryption, the above byte pattern results in the following Pos tuple.

Pos:[ . . . , (2,183,0),(305,235,0), . . . ]

But, if the second byte is missing either due an error in reverse transposition or an error in choosing the size bytes, there is a huge difference in the entries of Pos. FIG. 3 illustrates the tuple with the byte B2 missing.

The following Pos tuple is resulted with the erroneous Pos'.

Pos:[ . . . , (3,332,0),(373,282,0), . . . ]

It shall be noted that with such a decryption error, the number of bits retrieved from a byte and the purpose of the retrieval is disturbed, which continues until all the W×H entries are retrieved. In the process, some of the bits from CBM end up in the Pos entries, resulting in a huge error both in Pos and in CBM.

Consider the following RCBM tuple,

RCBM:[1,167,25,34,123 . . . ]

The tuple indicates that the first 167 bits in CBM are 1s, followed by runs of 25 0s, 34 1s and 123 0s. If the byte with value 167 is missed due to reasons stated above, the semantics of the tuple is completely altered. The modified tuple is composed of a first run of 25 1s, followed by 34 0s and 123 1s, indicating the presence of non existing colours and invalidating existing colours, disturbing the colour-position correlation in the decrypted image.

5.4 Confusion and Diffusion

The proposed algorithm is characterised by good Diffusion of plaintext bits in the cipher-text. If a bit in the plaintext changes, the colour of exactly one pixel changes from $C_o$ to $C_n$. This adds a new entry in Pos, the position of which is derived from the position of $C_n$ in the colour permutations. If $C_n$ is a new colour, then the entry is made within the first s entries in Pos. The entry corresponding to the $C_o$ is removed. The insertion and removal of entries has a cascading effect resulting in a shift of the subsequent entries. If $C_n$ is not already present in the plaintext, CBM is altered to accommodate $C_n$ changing exactly 2 bits. Even if only two bits are altered in CBM, the run composition is altered resulting in a considerable change in RCBM. Such an effect induces a change in W' and H'. These bit alterations are randomly dispersed in the entire image by the final byte transposition. Strict Plaintext Avalanche Criterion (SPAC), for a fixed key to satisfy, each bit of the ciphertext block changes with the probability of one half whenever any bit of the plaintext block is complemented. The insertion-removal of entries in Pos and the bit run alteration in RCBM affect an approximate 50% of bits, satisfying SPAC.

Differential Cryptanalysis attempts to develop a pattern or a relationship between unit changes in plaintext and the ciphertext. Higher the diffusion, higher is the complexity of a differential attack. A good measure of diffusion is the Percentage Inequality PI of two ciphertexts img' and img", the former derived from the original plaintext img and the latter by an unit change on img. The following equation defines PI, $$PI=(NDP \times 100)/(W \times H) \qquad (6)$$

where NDP is the number of pixels that differ in img" as compared to the corresponding pixels in img'. If the value of PI between two ciphertexts is high, then Diffusion is said to be high. Also, if this value, for various such ciphertext pairs changes randomly without exhibiting a pattern, a differential attack becomes practically impossible.

FIG. 4 depicts PI values for 25 different ciphertexts measured against the plaintext-ciphertext pair in FIG. 6. It shall be noted that the variation of PI ranges from 6% to 97% and that it does not follow any pattern.

While Diffusion complicates the relationship between the plaintext and the ciphertext, Confusion achieves the same between the ciphertext and the encryption key. In the proposed scheme, the key is not directly operated on the plaintext bits, rather used as seeds to generate random permutations. The random permutations are used as subkeys to arrange pixel position information and generate colour bit map, altering the basic structure of the plaintext. The final random transposition of ciphertext bytes removes the dependency of pixel position ordering on key1. Cryptographically Secure Random Permutations are characterised by a huge change in the permutation order, for a small change in the seed, complicating the Key-Ciphertext relationship. Also, it has been discussed that retrieval of keys from the permutations CP, TP, SP and PP is practically impossible. This complicates the key-ciphertext relationship, resulting in high degree of Confusion. Strict Key Avalanche Criterion (SKAC), for a fixed plaintext block, each bit of the ciphertext block changes with a probability of one half when any bit of the key changes. A one bit change in the key, would generate totally unrelated CPs, TP, SP and PP, resulting in a huge change in the ciphertext, satisfying SKAC.

As key1 changes, bit pattern in the CBM changes altering the content and the size of RCBM. This completely alters the values of W' and H'. FIG. 5 illustrates the change in the ciphertext size due to small changes in key1. For each attempt (x-axis), the value of key1 increments by a constant. It can be noted that the change in W' and H' does not follow any pattern.

5.5 Strength Criteria

This section evaluates the proposed algorithm against different Cryptographic Algorithm Strength Criteria specified by [3].

5.5.1 Security

It is highly impossible to derive the plaintext from the ciphertext without the use of keys key1 and key2. This can be attributed to the fact that the properties of the pixels, the colour and the position are separated. The colour information is completely concealed and the co-relation between the colours and the positions is completely obscured.

5.5.2 Cryptanalytic Complexity

It is apparent from Section 3.1 and (2) that a Brute Force Attack is highly infeasible. Since the number of unit operations required is the product of the number of attempts in each stage, it is highly impossible to carry out such an attack. It is clear from (3) and (4) that $2^{24}$ attempts are required to reveal the colour permutations in a Chosen Plaintext Attack. With the progress of the cryptanalysis, the complexity of analysing the ciphertext in each attempt increases, finally decaying to a Brute Force Attack. Many such CPTA attempts result in multiple valid colour permutations invalidating the very purpose of CPTA. The enormity of bitwise operations to be executed for huge number of reverse transposition attempts (refer (5)) and the lack of a deterministic criterionrenders the Known Plaintext Attack useless. Also, it is practically impossible and futile to attempt revealing the final transposition permutation.

5.5.3 Algorithm Awareness

Knowledge of the algorithm does not reduce the strength of the cipher, the strength lies in its structure. From the cryptanalysis section above, it is clear that it is impractical to either decrypt the ciphertext or to reveal the random permutations without the keys.

5.5.4 Correlation between Cipher and Plain texts

There is no correlation between the plaintext and the ciphertext bits since there exist no mapping map such that $$\text{map}(\text{img}(x,y)) = \text{img}'(x',y'), \forall 0 \leq x, x' < W, 0 \leq y, y' < H$$

Also, no correlation exists between the key bits and the output since the keys are used as seeds to generate the random permutations for encryption. Even if the random permutations are known, it is not possible to recover the key from them.

5.5.5 Dependency of Algorithm on Plaintext and Key

The substitutions and permutations in the algorithm are under the control of both the input data and the key. The substitutions are dictated by the input data such as the presence of a colour C and the position of the pixel bearing the colour. The keys influence substitution and transposition by means of their usage in random permutation generation.

5.5.6 Redundant Bit Groups

Redundant bit groups (pixels) in the plaintext are totally obscured in the ciphertext. Since it is the pixel positions and the colour bit map which constitute the ciphertext, an input image with a single colour is encrypted to be a multi-coloured output as depicted in FIG. 11.

5.5.7 Concealment of Plaintext Properties

For an image, the critical properties are the width and height, the set of colours, the pixel position-colour correlation and the pixel ordering. The algorithm is successful in concealing the complete set of image properties.

6 Simulation Results

This section provides the experimental results of a basic implementation of the proposed scheme. The experiments were conducted on a 1.83 GHz Intel Centrino Duo Processor with 1 GB memory.

Images of different width and height combinations have been considered for experiments, each being encrypted with a different set of keys.

FIG. 6 depicts the input image 'Lena' and its encrypted form. The values of key1 and key2 are 0.298760 and 0.514984 respectively. FIG. 7 presents the encryption result for the input 'Red Flower', encrypted with key1=0.658754 and key2=0.321786. It shall be noted that the encrypted images (b) suggest the change in the width and height of the ciphertext. Entries 2 and 5 of Table 2 provides further details about FIGS. 6 and 7 respectively.

FIGS. 8, 9 and 10 illustrate the histograms of the red, green and the blue components respectively, of the original and encrypted images of FIG. 7. It shall be noted that the histograms of the encrypted image suggest an uniform distribution and significant difference of the RGB components of the ciphertext as compared to the plaintext, a desirable property of any encryption scheme.

FIG. 11 portrays the encrypted image when the plaintext is composed of a single colour. It shall be noted that the algorithm ensures complete concealment of the plaintext properties.

Table 2 present the plaintext and the ciphertext properties, the encryption (ET) and the decryption time (DT) in seconds for a selected set of images with different size and NRP requirement.

TABLE 2

| Encryption-Decryption Time | | | | | |
|---|---|---|---|---|---|
| W × H | W' × H' | NRP | p | ET | DT |
| 256 × 256 | 461 × 224 | 37 | 8 | 5.4 | 4.7 |
| 512 × 512 | 635 × 499 | 21 | 1 | 6.0 | 5.0 |
| 640 × 480 | 614 × 576 | 703 | 8 | 6.1 | 5.1 |
| 1024 × 786 | 1201 × 745 | 431 | 1 | 7.7 | 6.1 |
| 2816 × 2112 | 3461 × 1961 | 258 | 11 | 27.0 | 17.4 |
| 3648 × 2736 | 4437 × 2417 | 5712 | 17 | 40.0 | 25.1 |

The results show that the algorithm possesses high security and is characterised by good confusion and diffusion. Given its high cryptanalytic complexity, the technique is particularly suitable for applications involving secure storage and transmission of sensitive data with longer lifetime. The algorithm can be easily adapted for any kind of digital data, and not necessarily only for digital image files. In the case of a non-image plaintext digital file, any set of 1 or more bytes can be considered as a pixel. For an RGB encoded image, each pixel is composed of 3 bytes making up 24 bits in total, allowing $2^{24}$ colours, and each colour permutation contains $2^{24}$ entries. In general therefore, in the case of a digital file with n bytes forming a pixel, there are $2^{8n}$ possible colours and as many entries in a colour permutation.

Future work includesresearch on the number of bits used to represent a colour. 24 bit values need not always result in optimal ciphertexts when the algorithm is applied for digital data other than images. A scan on the plaintext shall derive properties that aid in decidingthis value. Research is also necessary on the choice of Run Length Coding scheme. Faster and parallel implementations can be explored. The enhancement proposed as part of Section 3 can be analysed to derive the factor by which the cryptanalytic complexity is increased.

Appendix

Derivation: NRP

The minimum value of NRP is 1. Even if all the pixels bear the same colour (when no colour order can be defined), the first colour permutation is necessary to create CBM. There shall be enough permutations to define a colour order for the pixels until there are pixels of at least 2 colours available for processing. It is unnecessary to define a colour order for pixels of a single colour. If the pixels are grouped based on the colour and sorted on the group size, then NRP is the size of the group second in the list starting from the maximum size. If there are multiple sets with the maximum number of pixels, then NRP is the size of one such set.

1. $pix_{max} = \max(a(1), a(2), \ldots, a(2^{24} - 1))$
2. Multiset $U = \{i : a(i) = pix_{max}, \forall\, 0 \leq i < 2^{24}\}$
3. $pix_{smax} = \max(\{a(i)_{\forall 0 \leq i \leq 2^{24}-1}\} - \{pix_{max}\})$
4. $NRP = \begin{cases} pix_{max}, & sz(U) \geq 2 \\ pix_{smax}, & sz(U) = 1 \\ 1, & \text{otherwise} \end{cases}$ Derivation of Position Vector Size Let the number of bits required to represent any width $w_k$ and height $h_k$ be bw and bh respectively.
1. If $W \leq 2$, bw=1, else, bw=$\lceil \log_2(W) \rceil$
2. If $H \leq 2$, bh=1, else, bh=$\lceil \log_2(H) \rceil$ For any entry Pos, 1 bit is used to convey if all the pixels of a particular colour have been processed. The entry size is given by $$sz(Pos'_k) = bw + bh + 1 \text{ bits}$$

Since there are W×H number of such entries, the total number of bits of the Position Vector BPV is $$BPV = sz(Pos_k') \times (W \times H) \text{ bits}$$

But the size needs to be padded to make it a multiple of 8. Function R(x, y) returns the number to be added to y to make it a multiple of x.

$$R(x, y) = \begin{cases} x - ((y) \bmod(x)), & (y) \bmod(x) > 0 \\ 0, & \text{otherwise} \end{cases}$$

The number of padding bits required is pb=R(8, BPV). Hence, the total number of bytes required to represent tuple Pos' is $$sz(Pos') = (BPV + pb)/8 \text{ bytes}$$

Derivation: W', H' f and Pad bytes size p

The intermediate ciphertext bytes have to be padded to render the img' as a rectangular image with each pixel composed of 3 bytes. Values for W' and H' have to be chosen such that final ciphertext buffer forms a rectangular image of W'×H' pixels. Let
1. spb=sz(PB)+4
2. Rem=R(3, spb)
3. spb'=spb+Rem Padding the ciphertext by Rem bytes may not result in integral values for W' and H'. To make W' and H' integers, the ciphertext needs to be further padded. Calculate
1. fp=spb'/3, h=$\lfloor \sqrt[2]{fp} \rfloor$, q=$\lfloor h/2 \rfloor$
2. For any non negative integer i, $t_i$=R(i, fp)
3. W'=w', such that $t_{w'}$=min$\{t_i : t_i \neq 0, \forall h+q \geq i > h-q\}$
4. H'=(spb'+$t_{w'}$)/w'
5. p=Rem+(3×$t_{w'}$)
6. f=W'×H'×3

The technique starts by assuming the intermediate ciphertext of size fp bytes as a square image, h being its width. It caluclates the value of p for each candidate width w' from w'=(h−h/2) to (h+h/2). It chooses a width W'=mW for which p has the least non-zero value.

Derivation: M, T and MT

Number of invalid size byte sets in a bin of f bytes, of which z bytes carry value 0 and u bytes carry value greater than threshold t is derived as follows.

Let $B_n$ be the $n^{th}$ byte chosen. Note that $B_1 = W_1$, $B_2 = _2$, $B_3 = H_1$ and $B_4 = H_2$.

Let Z represent a byte with value 0, and N, a byte with a non-zero positive value. It shall be noted that m=(f−z) are the number of non-zero bytes available. Since 4 bytes have to be randomly chosen from the bin, there can be 16 distinct possibilities. Each possible byte combination $B_1 B_2 B_3 B_4$, the number of ways Num in which each combination be chosen and its validity Val as a size byte set, has been depicted in the Table 3, the left most byte being $B_1$.

Byte combinations which have both $B_1=0$ and $B_2=0$ or both $B_3=0$ and $B_4=0$ result in a value 0 for W or H respectively. Such combinations shall be discarded. The x indicates that a byte combination is invalid.

Table 4 depicts the principle in deriving the value N for all the 16 combinations.

It shall be noted that there are (z) ways to choose the first Z, (z−1) ways for the second, (f−z) ways for the first N, (f−z−1) ways for the second and so on. The number of 4 byte sets M, resulting in a value 0 for both or any of W and H is $$M = {^z}P_4 + 4(f-z)({^z}P_3) + 2({^z}P_2)({^{f-z}}P_2)$$

On the same lines, the number of 4 byte sets T, resulting in $W_2 > t$ or $H_2 > t$ can be derived. All byte combinations which have $B_2 > t$ or $B_4 > t$ are invalid. Table 5 depicts the invalid byte combinations and the corresponding value of N. G and L represent respectively a byte with value greater and lesser then t. There are exactly (v=f−u) number of bytes of type L.

Adding all the invalid combinations, the value of T is $$^uP_4 + 4(f-u)(^uP_3) + 5(^uP_2)(^{f-u}P_2) + 2(u)(^{f-u}P_3)$$

Byte combinations which qualify under both the above mentioned categories of invalid size byte sets, like ZZLG, are invalidated twice. The number of such combinations MT have to be subtracted once from M+T. The table 6 enlists such byte combinations and the value of N.

MT is defined by the following equation.

$$MT = 2(u)(f-u)(^zP_2) + 2(^zP_2)(^uP_2)$$

The total number of invalid size byte combination I is $$I = M + T - MT$$

Although the present invention has been described with respect to the above embodiments, it should be apparent to those skilled in the art that modifications can be made without departing from the scope of the invention.

TABLE 3

No. of size byte choices with H = 0 or W = 0

| $B_1B_2B_3B_4$ | Num | Val |
|---|---|---|
| ZZZZ | (z) (z − 1) (z − 2) (z − 3) | x |
| ZZZN | (z) (z − 1) (z − 2) (m) | x |
| ZZNZ | (z) (z − 1) (m) (z − 2) | x |
| ZZNN | (z) (z − 1) (m) (m − 1) | x |
| ZNZZ | (z) (m) (z − 1) (z − 2) | x |
| ZNZN | (z) (m) (z − 1) (m − 1) | ✓ |
| ZNNZ | (z) (m) (m − 1) (z − 1) | ✓ |
| ZNNN | (z) (m) (m − 1) (m − 2) | ✓ |
| NZZZ | (m) (z) (z − 1) (z − 2) | x |
| NZZN | (m) (z) (z − 1) (m − 1) | ✓ |
| NZNZ | (m) (z) (m − 1) (z − 1) | ✓ |
| NZNN | (m) (z) (m − 1) (m − 2) | ✓ |
| NNZZ | (m) (m − 1) (z) (z − 1) | x |
| NNZN | (m) (m − 1) (z) (m − 2) | ✓ |
| NNNZ | (m) (m − 1) (m − 2) (z) | ✓ |
| NNNN | (m) (m − 1) (m − 2) (m − 3) | ✓ |

TABLE 4

No. of choices for the four size bytes

| | Z | | N |
|---|---|---|---|
| $B_1$ | z | $B_1$ | f − z |
| $B_2$ | z − 1 | $B_2$ | f − z − 1 |
| $B_3$ | z − 2 | $B_3$ | f − z − 2 |
| $B_4$ | z − 3 | $B_4$ | f − z − 3 |

TABLE 5

No. of size byte combinations with W2 or H2 > threshold

| $B_1B_2B_3B_4$ | Num |
|---|---|
| GGGG | (u) (u − 1) (u − 2) (u − 3) |
| GGGL | (u) (u − 1) (u − 2) (v) |
| GGLG | (u) (u − 1) (v) (u − 2) |
| GGLL | (u) (u − 1) (v) (v − 1) |
| GLGG | (u) (v) (u − 1) (u − 2) |
| GLLG | (u) (v) (v − 1) (u − 1) |
| LGGG | (v) (u) (u − 1) (u − 2) |
| LGGL | (v) (u) (u − 1) (v − 1) |
| LGLG | (v) (u) (v − 1) (u − 1) |
| LGLL | (v) (u) (v − 1) (v − 2) |
| LLGG | (v) (v − 1) (u) (u − 1) |
| LLLG | (v) (v − 1) (v − 2) (u) |

TABLE 6

Size byte sets in both M and T

| $B_1B_2B_3B_4$ | N |
|---|---|
| ZZLG | (z) (z − 1) (f − u) (u) |
| ZZGG | (z) (z − 1) (u) (u − 1) |
| GGZZ | (u) (u − 1) (z) (z − 1) |
| LGZZ | (f − u) (u) (z) (z − 1) |

References

[1] W. Stallings, *Cryptography and Network Security principles and practices*, third ed.: Pearson Education, 2003.

[2] D. Knuth, *The Art of Computer Programming, Volume 2: Seminumerical Algorithms*, Reading, Mass.: Addison-Wesley, 1998.

[3] N. D. Jorstad, L. T. Smith, Jr., "Cryptographic Algorithm Metrics," *Institute for Defense Analyses Science and Technology Division*, January. 1997.

[4] C. Shannon, "Communication Theory of Secrecy Systems," *Bell Systems Technical Journal*, no. 4, 1949.

[5] J. Cheng; J. I. Guo, "A new chaotic key-based design for image encryption and de-cryption," The 2000 *IEEE International Symposium on Circuits and Systems*, 2000. Proceedings. ISCAS 2000 Geneva, vol. 4, no. 4, pp. 49-52, May. 2000.

[6] D. A. Osvik, A. Shamir, E. Tromer, *Cache Attacks and Countermeasures: the Case of AES*, November, 2005. available at http://theory.csail.mit.edu/tromer/papers/cache.pdf.

[7] SJ. Li and X. Zheng, "Cryptanalysis of a chaotic image encryption method," *The 2002 IEEE International Symposium on Circuits and Systems Proceedings* 2002. ISCAS 2002 Scottsdale, Ariz., vol. 1, 2006

[8] R. B. Davies, *Newran02C—a random number generator library*, April, 2006. available at http://www.robertnz.net/.

[9] Anatoliy Kuznetsov, *D-Gap Compression*, 2002. available at http://bmagic.sourceforge.net/dGap.html.

[10] S. K. Sahni, *Data Structures, Algorithms, and Applications in C++*, Second Edition, McGraw Hill, NY, 2005.

[11] Shiguo Lion, Jinsheng Sun and Zhiquan Wang, "A Novel Image Encryption Scheme Based-on JPEG Encoding," *Proceedings of the Eighth International Conference on Information Visualisation (IV04)*, 2004

[12] J. A. Munoz Rodrguez and R. Rodrguez-Vera, "Image encryption based on phase encoding by means of a fringe pattern and computational algorithms," *REVISTA MEXICANA DE FISICA* 52 (1), pp. 53-63, February 2004

[13] A. Mitra, Y. V. Subba Rao and S. R. M. Prasanna, "A New Image Encryption Ap-proach using Combinational Permutation Techniques," *INTERNATIONAL JOURNAL OF COMPUTER SCIENCE*, vol. 1, no. 5, 2006

[14] W. Diffie and M. E. Hellman, "New Directions in Cryptography," *IEEE Transactions Information Theory*, vol. 22, no. 6, pp. 644-654, November 1976.

[15] P. P. Dang and P. M. Chau, "Image Encryption for Secure Internet Multimedia Applications," *IEEE Transactions Consumer Electronics*, vol. 46, no. 3, pp. 395-403, August 2000.

[16] R. B. Davies, *COPACOBANA, a $10,000 DES cracker based on FP-GAs by the Universities of Bochum and Kiel*, December, 2006. available at http://www.copacobana.org/.

[17] A. Fuster and L. J. Garcia, "An Efficient Algorithm to Generate Binary Sequences for Cryptographic Purposes," *Theoretical Computer Science* 259, pp. 679-688, 2001.

The invention claimed is:

1. A method of encrypting an original digital image file representing an array of pixels having dimensions and composed of a sequence of bytes, each byte representing a pixel defined by a relative position of the pixel within the digital image file and a color value of the pixel within a range of possible color values, the method comprising:
using an encryption key to encode the relative position of each pixel separately from the color value of each pixel, wherein the encryption key comprises a first key used to generate a plurality of random permutations of the possible color values for each pixel, and wherein one of the random color permutations is used to generate a color bit map tuple having a number of elements equal to the number of possible color values; and
producing an encrypted digital image file in which a correlation between relative position and color value of each pixel in the original digital image file is concealed in the encrypted digital image file, wherein the dimensions of the original array of pixels are concealed in the encrypted digital image file.

2. The method of claim 1 in which the encryption key comprises a first key used to generate a plurality of random permutations of possible values for each pixel in the step of encoding the relative position separately from the color value of each pixel.

3. The method of claim 2 in which a position vector is created from the relative positions of the pixels, the position vector being encoded as a bit vector comprising flags indicating whether a pixel is the last in the sequence for a color value of that pixel.

4. The method of claim 1 in which the color bit map tuple is compressed to create a compressed tuple.

5. The method of claim 4 in which the color bit map tuple is compressed by run length encoding to create the compressed tuple.

6. The method of claim 4 in which the compressed tuple is combined with a position tuple to create a combined tuple.

7. The method of claim 6 in which the encryption key comprises a second key used in the method to generate a random permutation of the combined tuple to produce a further tuple.

8. The method of claim 6 in which the combined tuple is created by concatenating the compressed tuple with the position tuple.

9. The method of claim 7 in which the further tuple is composed of a number of bytes equal to a multiple of the number of pixels in the encrypted image, the encrypted image pixel position and color values being generated from sequences of bytes of the further tuple.

10. The method of claim 7 in which the combined tuple is padded with sufficient additional padding bytes such that the encrypted image is composed of a rectangular array.

11. A method of decrypting an encrypted digital image file in which a correlation between position and value of each byte in the digital image file is concealed in the encrypted digital image file, wherein the digital image file represents a digital image composed of an array of pixels, each byte representing a pixel having a relative position within the digital image, the value of each byte being a color value within a range of possible color values, the method comprising:

using a decryption key to decode the relative position and color value of each pixel in the digital image file from the encrypted digital image file, wherein using the decryption key comprises using the decryption key to generate a combined tuple from a byte vector representing the encrypted image;

deriving dimension information of the digital image file from the combined tuple; separating the dimension information from the combined tuple to leave a remaining tuple; and decoding the remaining tuple to form a color bit map tuple and a position tuple; and producing a decrypted digital image file from the decoded position and color value of each pixel, wherein producing the decrypted image file from the decoded position and color values comprises deriving the digital image from the color bit map and position tuples.

12. A computer program product including a computer readable storage device including instructions for instructing a computer to perform the method comprising:

using an encryption key to encode a relative position of each pixel of an array of pixels in an original digital image file separately from a color value of each pixel, wherein the encryption key comprises a first key used to generate a plurality of random permutations of possible color values for each pixel, and wherein one of the random color permutations is used to generate a color bit map tuple having a number of elements equal to the number of possible color values; and producing an encrypted digital image file in which a correlation between relative position and color value of each pixel in the original digital image file is concealed in the encrypted digital image file, wherein the dimensions of the original array of pixels are concealed in the encrypted digital image file.

* * * * *